US012665774B2

(12) United States Patent
Lindskog et al.

(10) Patent No.: US 12,665,774 B2
(45) Date of Patent: Jun. 23, 2026

(54) SYSTEMS AND METHODS OF PHYSICALLY UNCLONABLE FUNCTION (PUF)-BASED KEY DERIVATION FUNCTION

(71) Applicant: TELEFONAKTIEBOLAGET L M ERICSSON (PUBL), Stockholm (SE)

(72) Inventors: Niklas Lindskog, Lund (SE); Håkan Englund, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 27 days.

(21) Appl. No.: 18/287,936

(22) PCT Filed: Apr. 23, 2021

(86) PCT No.: PCT/IB2021/053387
§ 371 (c)(1),
(2) Date: Oct. 23, 2023

(87) PCT Pub. No.: WO2022/224022
PCT Pub. Date: Oct. 27, 2022

(65) Prior Publication Data
US 2024/0195640 A1 Jun. 13, 2024

(51) Int. Cl.
*H04L 9/32* (2006.01)
*H04L 9/08* (2006.01)

(52) U.S. Cl.
CPC .......... *H04L 9/3278* (2013.01); *H04L 9/0861* (2013.01)

(58) Field of Classification Search
CPC ....... H04L 9/3278; H04L 9/0861; H04L 9/14; H04L 2209/34; H04L 9/0866
See application file for complete search history.

(56) References Cited

U.S. PATENT DOCUMENTS 8,290,150 B2 10/2012 Erhart et al.
9,214,183 B2 12/2015 Van Rijnswou
(Continued)

FOREIGN PATENT DOCUMENTS

CN 105337725 A 2/2016
CN 109522758 A 3/2019
(Continued)

OTHER PUBLICATIONS

Karageorgos, I., et al., "Chip-to-Chip Authentication Method Based on SRAM PUF and Public Key Cryptography", Journal of Hardware and Systems Security, 2019. 3:382-396.
(Continued)

*Primary Examiner* — J. Brant Murphy
(74) *Attorney, Agent, or Firm* — Ericsson Inc.

(57) ABSTRACT

Solutions and methods are disclosed herein for generating a key from outputs of a Physically Unclonable Function (PUF) and using the key for a cryptographic algorithm. In one embodiment, a device generates the key, which comprises (i) receiving a request to generate a key comprising a defined number of bits for a particular cryptography algorithm and (ii) responsive to receiving the request, generating a valid key for the particular cryptography algorithm. The step of generating the valid key further comprises (a) generating one or more first challenges for a PUF, which is one or more of a plurality of challenges in a challenge space of the PUF, (b) generating a first potential key based on one or more first responses by the PUF responsive to the one or more first challenges, and (c) determining whether the first potential key satisfies one or more predefined criteria for the particular cryptography algorithm.

17 Claims, 9 Drawing Sheets

(56)  References Cited

U.S. PATENT DOCUMENTS

| 10,079,678 | B2 | 9/2018 | Smith et al. |
| 10,097,348 | B2 | 10/2018 | Kara-Ivanov et al. |
| 2008/0279373 | A1 | 11/2008 | Erhart et al. |
| 2013/0142329 | A1 | 6/2013 | Bell et al. |
| 2020/0052893 | A1 | 2/2020 | Lu et al. |
| 2020/0053061 | A1* | 2/2020 | Cambou ............. H04L 63/0457 |
| 2020/0076623 | A1 | 3/2020 | Cambou et al. |
| 2021/0258174 | A1* | 8/2021 | Schoinianakis ....... G06F 21/602 |
| 2024/0072996 | A1* | 2/2024 | Webb ................... H04L 9/0838 |

FOREIGN PATENT DOCUMENTS

| EP | 0534420 | A2 | 3/1993 |
| EP | 2526505 | B1 | 11/2012 |
| EP | 3641219 | A1 | 4/2020 |
| WO | 2018141378 | A1 | 8/2018 |
| WO | 2022259012 | A1 | 12/2022 |

OTHER PUBLICATIONS

Lao, Y., et al., "Reconfigurable Architectures for Silicon physical Uncionable Functions", 2011 IEEE International Conference on Electro/Information Technology, May 15-17, 2011, 7 Pages.
Trusted Computing Group, et al. "Trusted Computing Group and NVMe Work Group Joint White Paper: TCG Storage, Opal, and NVMe", Aug. 2015, 11 Pages.

* cited by examiner

SYSTEMS AND METHODS OF PHYSICALLY UNCLONABLE FUNCTION (PUF)-BASED KEY DERIVATION FUNCTION

This application is a 371 of International Application No. PCT/IB2021/053387, filed on Apr. 23, 2021, the disclosure of which is fully incorporated herein by reference.

TECHNICAL FIELD

Systems and methods of the present application generally relate to solutions for electronically securing electronic devices using security keys generated by Physically Unclonable Functions (PUFs).

BACKGROUND

Physically Unclonable Functions (PUFs) are circuits, components, processes, or other entities capable of generating an output, such as a key, a digital identity, or an authentication token. A PUF should be resistant to cloning; for example, a device that has a PUF would be difficult to clone to generate the same output of the PUF with another device.

PUFs

PUFs are used to create a unique response by using implicit or explicit randomness. This response can be used for cryptographic or device identity purposes. Implicit randomness can include unpredictable manufacturing differences in semiconductor devices that can be exploited to create a device-unique response. On the other hand, explicit randomness means that the introduction of randomness requires extra steps during manufacturing or a later stage, e.g., at packaging.

A PUF comprises one or several subfunctions, sometimes called elements or components, each of which contributes a part of the PUF response. One example of the subfunctions of a PUF may be a ring oscillator pair. A ring oscillator is formed by an uneven number of signal inverters in a ring, where gate delay propagation is used as a randomness source. The PUF response is based on a comparison between the two ring oscillators where the number of oscillations at a given point is measured. In particular, the PUF response may be an identifier of the fastest ring oscillator or the slowest ring oscillator. Another example of the subfunctions of a PUF may be uninitialized Static Random Access Memory (SRAM) cells, which have two possible states (0 and 1). Prior to power-up, an SRAM cell is in neither state. At power-up, the SRAM cell stabilizes in one of the two states. The PUF response is the entered state of a set of SRAM cells. Yet another example is an arbiter. An arbiter might be regarded as a digital race condition between two or more signal paths on a chip where a so-called arbiter circuit identifies a winning signal. The paths might comprise several switch blocks which can alter the signal paths. The PUF response, in this case, can, e.g., be the Identifier (ID) of the winning signal. In some PUF entities, the same subfunction(s) might generate several outputs by utilizing different parts of the PUF challenge. Each subfunction also has the property that it is physically unclonable, i.e. unique for the device. A PUF may therefore comprise several subfunctions which can be used as independent PUFs, albeit with fewer possible challenges and fewer response bits.

The PUF response can be used to create a unique device identity or a device unique key without having to store the key in, e.g., Battery Backup Random Access Memory (BBRAM) or One Time Programmable (OTP) memory.

Hence, it is much harder for an attacker to mount certain types of hardware attacks with the goal of recovering the key from a device using a PUF.

There are several types of PUFs, but all PUFs accept a challenge as input. The PUFs generally translate the challenge into either (i) a selection of at least one element within the PUF or (ii) a configuration of at least one element within the PUF. Depending on what type of PUF is used, the number of challenges that are accepted by the PUF can vary from just one to an exponential amount related to the number of subfunctions.

Most PUF types additionally require helper data to function properly, i.e. to increase the possibility of recreating the same response given the same challenge.

Some PUF types can remap the challenge-response mapping one or several times. After the remapping, some or all challenges may result in new responses. A reconfigurable PUF can alter the entire challenge space, e.g., to make sure that all challenges receive a new response. An erasable PUF is a PUF that has the possibility to change responses of specific challenges. Alternatively, the PUF might respond with a null sequence, for example all zeros, for challenges marked as "erased." When a PUF response (or a derivation thereof) is used to encrypt another cryptographic key, the PUF response is called Key Encryption Key (KEK).

Cryptographic Algorithms and Accepted Keys

There are, somewhat simplified, two types of algorithms for cryptography. First, asymmetric algorithms, such as Rivest-Shamir-Adleman (RSA), Elliptic Curve Digital Signature Algorithm (ECDSA), GLYPH (which is a variant of the Güneysu, Lyubashevsky, and Poppelmann (GLP) algorithm), and N-th Degree Truncated Polynomial Ring (NTRU), use a private key and a public key. A signature or encryption performed with the private key can be validated or decrypted using the public key or vice versa.

Second, symmetric algorithms, such as Advanced Encryption Standard (AES), TwoFish, and ChaCha, require both users to possess the same key to decrypt and encrypt data. Symmetric cryptography also encompasses message authentication codes used for authentication and integrity protection, e.g., Hash Message Authentication Code (HMAC) or Galois Message Authentication Code (GMAC). Some algorithms combine both aspects, called authentication encryption, e.g., Galois/Counter Mode (GCM).

Meanwhile, homomorphic encryption algorithms may be a part of either of these categories and add the ability to perform operations on crypto-text preserved in the plaintext. An example of homomorphic encryption algorithms is Pallier.

All of the above-mentioned algorithms require cryptographic keys, all with different requirements.

RSA and Pallier require prime numbers as private keys.

NTRU encryption uses polynomials which need to have an inverse in predefined fields. GLYPH (and other ring-learning with error schemes) also uses polynomials that must have coefficients smaller than the absolute value of a predefined integer.

Some cryptographic algorithms allow uniform randomness as a key (i.e., any key). However, in some algorithms, keys with certain properties weaken the algorithm and should be avoided, e.g. Data Encryption Standard (DES), Rivest Cipher 4 (RC4), simplified International Data Encryption Algorithm (IDEA), Blowfish, GCM/GMAC, and Digital Signature Algorithm (DSA).

To ensure that a key fulfills a certain criterion, the key is checked after generation. The probable primality of a number may be checked by using the Rabin-Miller algorithm.

The inverse of a polynomial in a field may be checked by using the Euclidian algorithm.

RELATED ART

Some work exists in the field of PUF and key derivation. Chinese Patent Application Publication No. CN105337725A discloses that a PUF of SRAM type has a Key Derivation Function (KDF). This patent application defines KDF as "a hash algorithm, HMAC algorithm or HKDF algorithm." However, the solution in this patent application does not describe a method to validate the output of the KDF and is therefore only suitable for algorithms that allow uniform randomness as the cryptographic key.

U.S. Patent Application Publication No. 2008/0279373 A1 (Erhart et al.) (hereinafter "Erhart") discloses that several PUF responses are used to create an RSA key, i.e. the PUF responses are used as a seed to a Pseudo-Random Number Generator (PRNG). The PRNG extends the response from 256 bits to 1024 bits. The prime numbers derived from the PRNG output are extracted using a "prime number generator" during enrollment. An "offset" is stored to facilitate the recreation of the prime number at a later point in time. The RSA key created using these prime numbers is used to identify the device and is signed by a KEK-encrypted asymmetric key stored on the device.

European Patent Application Publication No. EP 2526505 B1 (Tuyls et al.) (hereinafter "Tuyls") describes a method to extract two keys from one PUF. The first key is sent to a key generation algorithm. The second key is sent to a simpler key derivation algorithm (e.g., a hash function) and is used to encrypt the first key. The encrypted first key is stored on the device.

A paper titled "Chip-to-Chip Authentication Method Based on SRAM PUF and Public Key Cryptography" (Katageorgos et al., Journal of Hardware and Systems Security, 2019) (hereinafter "Katageorgos") describes that a PUF is used to seed a Linear Feedback Shift Register (LFSR) in a mechanism that produces RSA prime numbers. The output from the LFSR is repeatedly tested with a probabilistic primality testing algorithm. If the output from the LFSR is not found to be prime, the LFSR is shifted and the primality testing is performed again. This procedure has to be performed every time the RSA keys are requested.

A paper titled "Reconfigurable Architectures for Silicon Physical Unclonable Functions" (Lao et al., IEEE International Conference on Electro/Information Technology, 2011) introduces a number of reconfigurable PUFs. In particular, a model where a pre-processing reconfigurable component is introduced before the PUF and another post-processing reconfigurable component is introduced after the PUF. The authors of this paper discuss constructions where the component that pre-processes a user seed into a PUF challenge, used as an input to the PUF, is an LFSR or a hash function. However, the authors of this paper do not describe any functionally to feed back or handle resulting keys that are not fulfilling requirements for a cryptographic algorithm.

Problems with Existing Solutions

When a cryptographic key is generated from a PUF response, the output is usually a random binary string suited for some cryptographic algorithms which may use any input of a certain length as a key. However, several cryptographic algorithms do not accept uniform randomness but instead need, for example, a prime number or a polynomial with certain traits. A trivial solution is to continuously hash the PUF result until it fulfills the requirement of the algorithm. However, this solution adds latency to every key generation as the same hash chain must be used each time. If the key is larger than the output of the hash function, the workload to produce the key may become unfeasible.

Other solutions disclosed in Erhart, Tuyls, Katageorgos use the PUF values as a seed to an external KDF such as an LFSR or a PRNG. Some of these solutions also use key stretching which reduces the entropy of the key, e.g. turns a 256 bit PUF response to a 1024 bit key (entropy of the final key is still 256 bits). Furthermore, if the key fulfills a certain criterion, e.g. to match the RSA algorithm, additional information must be stored to ensure the output of the external key derivation function is a prime number.

Another alternative solution is to program a key known to fulfill the criterion of the encryption algorithm. This solution requires the key to be known beforehand and to be programmed into a BBRAM or an OTP memory. This key may be encrypted by the PUF, using a KEK. The drawback of such a solution is that the key must be created externally and thereby risk exposure and leakage. Tuyls solves the drawback by deriving the key on the device but instead requires a separate KDF and key stretching.

SUMMARY

Systems and methods are disclosed herein for generating a key from outputs of a Physically Unclonable Function (PUF) and using the key as a cryptographic key for a specific algorithm. In one embodiment, a method for providing a cryptographic key to a client comprises receiving, from the client, a request to generate a key having a defined number of bits for a particular cryptography algorithm. Responsive to receiving the request, the method further comprises providing a valid key for the particular cryptography algorithm to the client, which includes (a) generating a set of challenges (i.e., (i) one challenge or (ii) more challenges from a plurality of challenges in a challenge space of the PUF) for the PUF and (b) generating at least one potential key based on a set of responses by the PUF responsive to the set of challenges.

In this manner, a PUF can be customized to produce keys for any predefined algorithm regardless of the criteria needed for the key to be valid. Also, the present solutions and methods produce a deterministic and cryptographically valid key without using a hash chain or similar time-consuming technique. Once a valid cryptographic key has been found, states (or series of states, which create the valid key) are saved in order to enable fast recreation of the key.

For each potential key of the at least one potential key, the method further comprises (c) determining whether the potential key satisfies one or more predefined criteria for the particular cryptography algorithm. If the potential key satisfies the one or more predefined criteria for the particular cryptography algorithm, the method further comprises providing the potential key to the client as the valid key.

If each of the at least one potential key does not satisfy the one or more predefined criteria for the particular cryptography algorithm, the method comprises repeating steps (a)-(c) for different sets of challenges from the challenge space of the PUF until keys are found that satisfies the one or more predefined criteria for the particular cryptography algorithm. In one embodiment, the one challenge in the set of challenges corresponds to selection of at least one element in the PUF to generate the set of responses and at least one response in the set of responses is a result of the selection. In one embodiment, the one challenge in the set of challenges corresponds to configuration of at least one element in the PUF and at least one response in the set of responses is a result of the configuration.

In one embodiment, generating the at least one potential key comprises applying error correction based on helper data to the set of PUF responses.

In one embodiment, in a case that the set of challenges consists of a single challenge, the set of responses consists of a single response by the PUF responsive to the single challenge, and the at least one potential key is a single potential key. In one embodiment, generating the at least one potential key comprises generating helper data responsive to the single response by the PUF.

In one embodiment, in a case that the set of challenges consists of two or more challenges, the set of responses by the PUF responsive to the set of challenges consists of two or more responses. In one embodiment, generating the at least one potential key comprises generating helper data responsive to the two or more responses by the PUF. In one embodiment, in a case that the at least one potential key consists of two or more potential keys; generating the at least one potential key comprises combining the two or more responses by the PUF.

In one embodiment, the at least one potential key consists of two or more potential keys, wherein each of the two or more potential keys are formed by at least one function taking at least one part of each of the two or more responses as input.

In one embodiment, the method further comprises providing the set of challenges, which are used to generate the valid key, to the client. In one embodiment, generating the set of challenges for the PUF comprises generating the set of challenges for the PUF based on a state module, and the method further comprises providing, to the client, the state used to generate the set of challenges used to generate the valid key, or saving the state locally in the device.

In one embodiment, generating the potential key comprises generating the potential key based on the set of responses by the PUF responsive to the set of challenges and associated helper data, and the method further comprises providing the associated helper data used to generate the valid key to the client or saving the associated helper data locally in the device.

In one embodiment, the method further comprises storing information that indicates the set of challenges used to generate the valid key in association with a tag or an identifier, and providing the tag or the identifier to the client.

In one embodiment, receiving the request to generate a key further comprises receiving a unique token, and generating the set of challenges for the PUF comprises generating the set of challenges for the PUF based on the unique token, which is, for example, a password, a Personal Identification Number (PIN) code, or a biometric input.

In one embodiment, a device for generating a key for a cryptography algorithm comprises one or more processing circuitries configured to cause the device to receive, from a client, a request to generate a key comprising a defined number of bits for a particular cryptography algorithm. Responsive to receiving the request, the one or more processing circuitries are configured to cause the device to provide a valid key for the particular cryptography algorithm to the client. In order to provide the key for the particular cryptography algorithm, the one or more processing circuitries are further configured to cause the device to (a) generate a set of challenges for a PUF (i.e., one challenge or more challenges from a plurality of challenges in a challenge space of the PUF), (b) generate at least one potential key based on a set of responses by the PUF responsive to the set of challenges, and (c) for each potential key of the at least one potential key, determine whether the potential key satisfies one or more predefined criteria for the particular cryptography algorithm. If the potential key satisfies the one or more predefined criteria for the particular cryptography algorithm, the device is configured to provide the potential key to the client as the valid key.

If each of the at least one potential keys does not satisfy the one or more predefined criteria for the particular cryptography algorithm, the device is configured to repeat steps (a)-(c) for different sets of challenges from the challenge space of the PUF until the potential key satisfies the one or more predefined criteria for the particular cryptography algorithm.

In one embodiment, a method for providing a cryptographic key to a client comprises receiving, from the client, a request to recreate a key having a defined number of bits for the client for a particular cryptography algorithm. Responsive to receiving the request, the method further recreates the key for the client for the particular cryptography algorithm. Recreating the key for the client for the particular cryptography algorithm comprises providing a set of challenges to a PUF. The set of challenges comprises (i) one challenge or (ii) more of a plurality of challenges in a challenge space of the PUF. Also, the set of challenges is a set of challenges that is (a) comprised in the request received from the client, (b) stored in association with a tag or an identifier that is comprised in the request received from the client, or (c) generated by the device based on a state that is either comprised in the request received from the client or stored locally in the device. The method further comprises generating the key based on the set of responses by the PUF responsive to the set of challenges and providing the key to the client.

In one embodiment, the set of challenges consists of a single challenge. In an alternative embodiment, the set of challenges consists of two or more challenges.

In one embodiment, generating the key comprises applying an error correction code to the set of responses by the PUF responsive to the set of challenges.

In one embodiment, the error correction code is based on helper data that is either (i) comprised in the request received from the client or (ii) stored in association with a tag or identifier that is comprised in the request received from the client.

In one embodiment, a device for generating a key for a cryptography algorithm comprises one or more processing circuitries configured to cause the device to receive, from a client, a request to recreate a key comprising a defined number of bits for the client for a particular cryptography algorithm. Responsive to receiving the request, the device is configured to recreate the key for the client for the particular cryptography algorithm. In order to recreate the key for the client for the particular cryptography algorithm, the device is further configured to provide a set of challenges to a PUF wherein the set of challenges comprises one challenge or more of a plurality of challenges in a challenge space of the PUF, and the set of challenges is (a) comprised in the request received from the client, (b) stored in association with a tag or identifier that is comprised in the request received from the client, or (c) generated by the device based on a state that is comprised in the request received from the client or stored locally in the device. The device is also configured to generate the key based on a set of responses by the PUF responsive to the set of challenges. The device is further configured to provide the key to the client.

The present solutions and methods do not use key extension to transform the PUF response into a valid key (such as a Linear Feedback Shift Register (LFSR) or a Pseudo-Random Number Generator (PRNG)). Thus, the entropy of the produced key is not reduced. Furthermore, the present solutions and methods do not need an external KDF to create a valid key. The generated PUF key is guaranteed to fit the cryptographic algorithm the key is intended for. By using different starting states, the same PUF can generate keys for several different algorithms, possibly using different validation methods.

BRIEF DESCRIPTION OF THE DRAWINGS

The accompanying drawing figures incorporated in and forming a part of this specification illustrate several aspects of the disclosure, and together with the description serve to explain the principles of the disclosure. Optional features are represented by dashed boxes.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Many cryptographic algorithms depend on the ability to generate large prime numbers or certain types of polynomials to function as cryptographic keys. A PUF response generally requires derivation functions in order to translate it into a cryptographic key with the aforementioned properties. By using the solutions and methods of the present disclosure, the PUF 106 is connected to a state module 108 which is updated and creates new challenges until the PUF 106 produces an output that is a valid cryptographic key. Once this is done, the state is saved and the valid key can be instantly generated without the need for key storage or external key derivation functions.

The solutions and methods of the present disclosure also allow the generation of keys larger than the size of a PUF response. By combining several PUF responses to be combined to form a key, each new response adds entropy to the cryptographic key.

Figure 1:
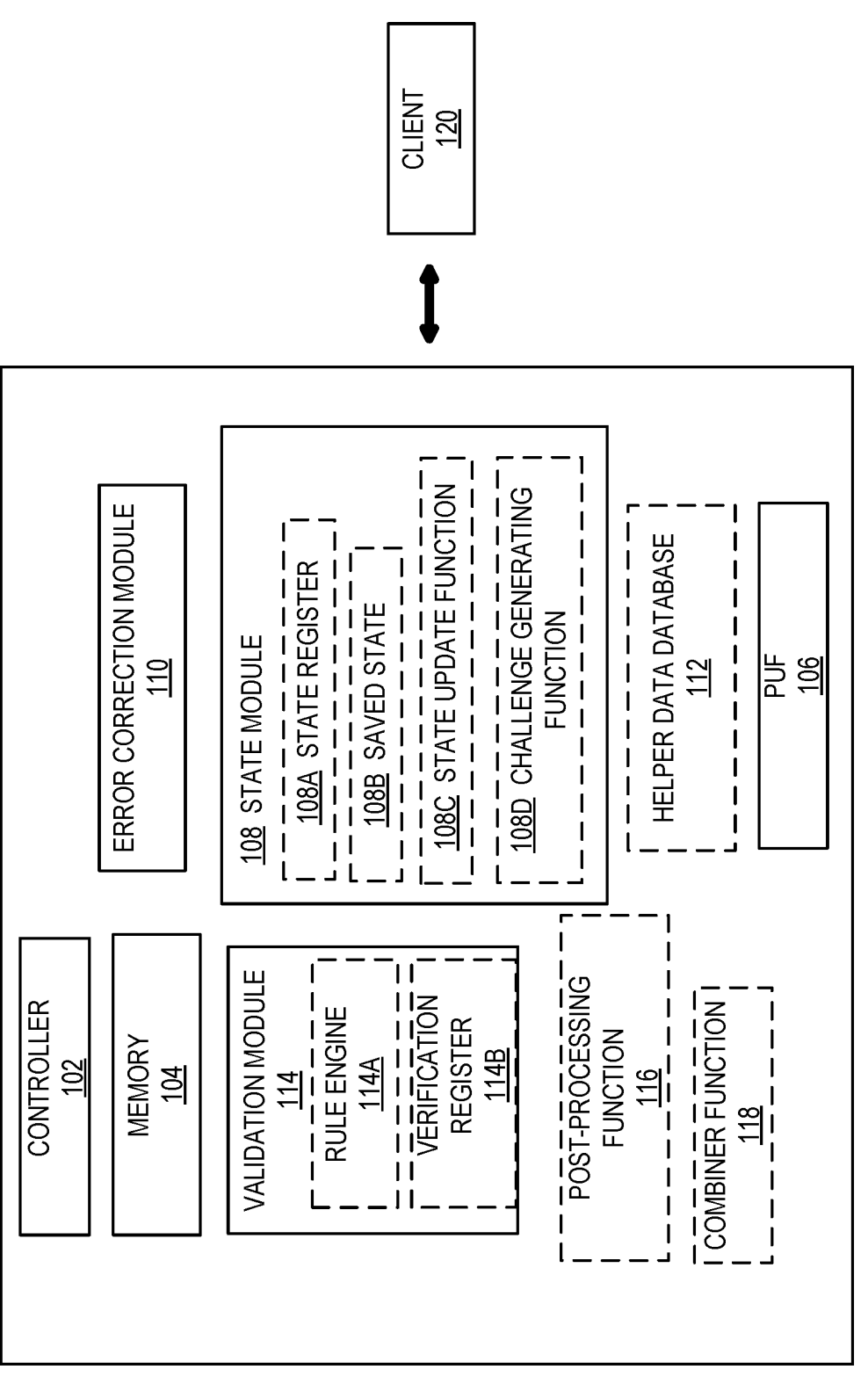
FIG. 1 illustrates an example of a device or a computer that implements embodiments of the present disclosure.

FIG. 1 illustrates an example of a secure hardware component 100 according to some embodiments of the present disclosure. The secure hardware component 100 may be, for example, an Integrated Circuit (IC), a System on a Chip (SoC), or the like. The secure hardware component 100 includes in this example, the following components. Note that optional components are represented by dashed lines/boxes.

Controller 102: Examples of the controller 102 are Central Processing Units (CPUs), Application Specific Integrated Circuits (ASICs), or Field Programmable Gate Arrays (FPGAS).

Memory 104: Examples of the memory 104 are non-transitory computer readable mediums like Read Only Memory (ROM), Random Access Memory (RAM), cache memory, or flash memory devices. The memory 104 is utilized by the controller 102 to store data or executable instructions to provide at least some of the functionality of at least some of the embodiments described herein.

Physically Unclonable Function (PUF) 106: The PUF 106 is preferably a PUF with a plurality of Challenge-Response Pairs (CRPs). The PUF 106 may be implemented on, e.g., an FPGA or in an ASIC. However, the PUF 106 is not limited to be implemented on an FPGA or in an ASIC. The PUF 106 may be implemented in any suitable type of hardware or any suitable combination of hardware and software.

State module 108: The state module 108 may decide and update the challenge provided to the PUF 106. The state module 108 may be hardware or a combination of hardware and software that implements a state machine.

State register 108A: The state register 108A may hold the current state of the state machine.

Saved state 108B: In one embodiment (e.g., in Embodiment 2 described below), the saved state 108B is the saved starting state for the PUF 106. The saved state 108B may be implemented as a permanent memory (e.g., One Time Programmable (OTP) memory) or a reprogrammable memory (e.g., Multi Time Programmable (MTP) memory).

State update function 108C: The state update function 108C may deterministically update the state of the state module 108.

Challenge generating function 108D: In some embodiments, the PUF 106 may not accept all states as challenges. The challenge generating function 108D may transform the state of the state module 108 into a valid challenge for the PUF 106.

Error correction module 110: The error correction module 110 applies error correction to recreate a PUF response, for example, by using helper data. The helper data may comprise error correcting codes, such as Bose-Chaudhuri-Hocquenghem (BCH) codes or Reed-Muller codes. The helper data may additionally comprise general knowledge of the PUF, such as unstable bits to remove from the response. The error correction module 110 may also generate helper data. For example, the error correction module 110 may be implemented (a) in software using a CPU, (b) in programmable logic on an FPGA, (c) as a pure hardware implementation, or (d) as any combination of software and hardware.

Helper data database 112: The helper data database 112 stores entries of helper data (e.g., error correcting codes used by the error correction module 110), which helps restore PUF responses.

Validation module 114: The validation module 114 ensures that a cryptographic key is valid according to one or more predefined rules. Note that different sets of rules may be used for different cryptography algorithms (i.e., for different types of cryptographic keys). For example, the validation module 114 may be implemented (a) in software using a CPU, (b) in programmable logic on an FPGA, (c) as a pure hardware implementation, or (d) as any combination of software and hardware.

Rule engine 114A: The rule engine 114A holds one or several rules against which a potential key will be validated. For example, the rule engine 114A may be implemented (a) as a component that takes a configuration (CPU/FPGA) or (b) as a fixed solution that has predefined algorithms it supports, such as ASIC.

Verification register 114B: PUF responses may be stored in or appended to the verification register 114B.

Post-processing function 116: The post-processing function 116 may be used between the PUF 106 and the validation module 114 in order to break the correlation between PUF responses which have closely related challenges (i.e., low distance). The post-processing function 116 may, for example, be embodied by a One-Way Function (OWF) or a Lookup Table (LUT).

Combiner function 118: The combiner function 118 may be a function concatenating the two or several the two or more responses.

The secure hardware component 100 may exchange signals or data with a client 120 and implement any one or more of the following embodiments of the present disclosure.

The embodiments of the present disclosure, which may be implemented by the secure hardware component 100, include two modes: (a) a generate mode in which a key for a particular cryptographic algorithm is generated, and (b) a recreate mode in which a previously generated key is recreated. In the generate mode, the goal is to find a PUF response by the PUF 106 or a combination of PUF responses by the PUF 106 that forms a valid cryptographic key for a particular cryptographic algorithm. Depending on the particular cryptographic algorithm, the key may comprise either one PUF response or a combination of several PUF responses.

The state module 108 is used to generate new challenges for the PUF 106. The state module 108 is updated in a deterministic manner, i.e. if the state module 108 is in a state A, the next state will always be state B, and then state C, etc. The state module 108 may implement a deterministic algorithm that produces a long, non-repeating sequence of bits. From any given starting state, each shift should result in a new state. Looping through all states in the state module 108 should be infeasible. Ideally, the state module 108 should produce a de Bruijn sequence (i.e., going through a possible combination of a given bit size once before repeating). Examples of state module 108 implementations are Linear Feedback Shift Register (LFSR), Cellular Automata Shift Register (CASR), or a counter. The state module 108 implementations may also be combined with a non-linear part such as a Non-Linear-Feedback Shift Register (NLFSR) or as a hash function.

Upon entering the generate mode, a seed is chosen for the state module 108, which may be, for example, either a fixed string, a client-provided seed, or a random number. The first state of the state module 108 is used to generate the first challenge to the PUF 106. If the resulting first PUF response contains enough bits to generate the key, the first PUF response is sent to the validation module 114. Otherwise, the state module 108 is updated, a new challenge is given to the PUF 106, and a new PUF response is generated and combined with the first PUF response. Note that the challenge provided to the PUF 106 is, in one embodiment, the actual state of the state module 108. However, in another embodiment, the state of the state module 108 is provided to the challenge generating function 108D, which deterministically transforms the state into a valid challenge for the PUF 106.

After each generation of a PUF response or combination of PUF responses to be used as a potential key or further processed (e.g., by the error correction module 110) to provide the potential key, corresponding helper data may be generated and temporarily stored, for example, in the helper data database 112. The helper data is intended to enable the recreation of the same PUF response, or the same combination of PUF responses, at a later point in time. If the PUF response is not a part of a valid key, the temporary helper data is discarded. Once enough bits for a potential key have been generated, the PUF response(s) is either sent to the validation module 114 as a potential key or sent to the error correction module 110, which performs error correction to provide the potential key. It is also possible to use the post-processing function 116 between the PUF 106 and the validation module 114. This may be beneficial to break the correlation between PUF responses which have closely related challenges (i.e., low distance). In other words, the PUF response(s) may undergo post-processing prior to storing them in the verification register 114B. The post-processing function 116 may, for example, be embodied by a One-Way Function (OWF) or a Lookup Table (LUT). Examples of the OWF are Message Authentication Code (MAC) functions and hash functions such as the SHA and BLAKE families.

Depending on the particular implementation, the validation module 114 may either require a policy before entering the generate mode or have a fixed set of cryptography algorithms (and respective sets of validation rules) that the validation module 114 supports. The validation module 114 may also require the client 120 to explicitly indicate the particular cryptography algorithm for which the key should be generated and thus for which the generated key should be valid.

The validation module 114 applies the appropriate rules to check if the potential key (i.e., the PUF response, the combined PUF responses, or error corrected versions thereof) forms a valid key. Validation may be both deterministic and statistical (e.g., a prime number is not guaranteed to be prime until all possible factors have been tested). As the validation is only done in the generate mode, the validation does not affect the recreate mode.

In the recreate mode, a previously generated and verified key is recreated without going through the validation module 114.

Embodiment 1

In the generate mode of Embodiment 1, the client 120 is responsible for storing the state (e.g., starting state) or the challenge(s) used to generate the valid key and, in some embodiments, the helper data used to generate the valid key. In other words, when a key has been validated to be correctly generated, the secure hardware component 100 sends both the key and the aforementioned information to the client 120, where the information is stored. This information is provided from the client 120 to the secure hardware component 100 at a later time when the client 120 desires the key to be recreated. The state or challenge(s) and optionally the helper data may be stored in external memory.

Starting from a seed, the state of the state module 108 is repeatedly updated. Each state produces a new challenge for the PUF 106 that causes the PUF 106 to generate a unique PUF response. The PUF response is either considered a potential key or is further processed (e.g., by the error correction module 110) to provide a potential key. A validation check is performed for the potential key to determine whether the potential key is a valid key for the specific cryptography algorithm. This process continues until a valid key has been generated.

With respect to the validation check, each potential key (i.e., each PUF response from the PUF 106 or each potential key derived from each PUF response) is sent to the validation module 114, which determines the validity of the potential key for the specific cryptography algorithm against a certain set of rules. If the potential key is found to be valid, the corresponding state used to create the challenge that resulted in the valid key is either stored in the memory 104 (e.g., a write protected memory) or sent to the client 120 that requested the key for off chip storage.

In one embodiment, if the key is larger than the number of bits output by the PUF 106 in the PUF response, several PUF responses can be combined to generate the key. In one embodiment, the combination of these PUF responses is stored in a validation register which awaits enough bits to be generated prior to validating the key. As the state module 108 is deterministic, only the first state needs to be saved. In some embodiments, the state module 108 is not used during key recreation and all states are saved explicitly.

In one embodiment, in order to recreate a previously generated key, a client 120 provides respective information (e.g., starting state, challenge(s), helper data) to the secure hardware device 100. This information is used to provide the challenge(s) to the PUF 106 that results in recreation of the desired key. In one embodiment, if the key is based on several PUF responses, the state module 108 recreates the same series of challenges as were used when the key was generated. As the key has previously been confirmed to be valid, no validation process is needed. The validation module 114 may support several different algorithms and the PUF 106 may generate several different keys valid for the same or different algorithms.

In one embodiment, the information returned to and stored by the client 120 includes the state(s) or starting state and optionally the helper data used to generate the key. While this information (i.e., the state(s) and optionally the helper data) in itself is not sensitive, without a user-specific component (for example, Embodiment 4 below) involved in the generation of a PUF challenge(s) from the state, the PUF 106 should preferably be access protected as anyone with access and the information (the state and the helper data) is able to recreate the key.

Figure 2A:
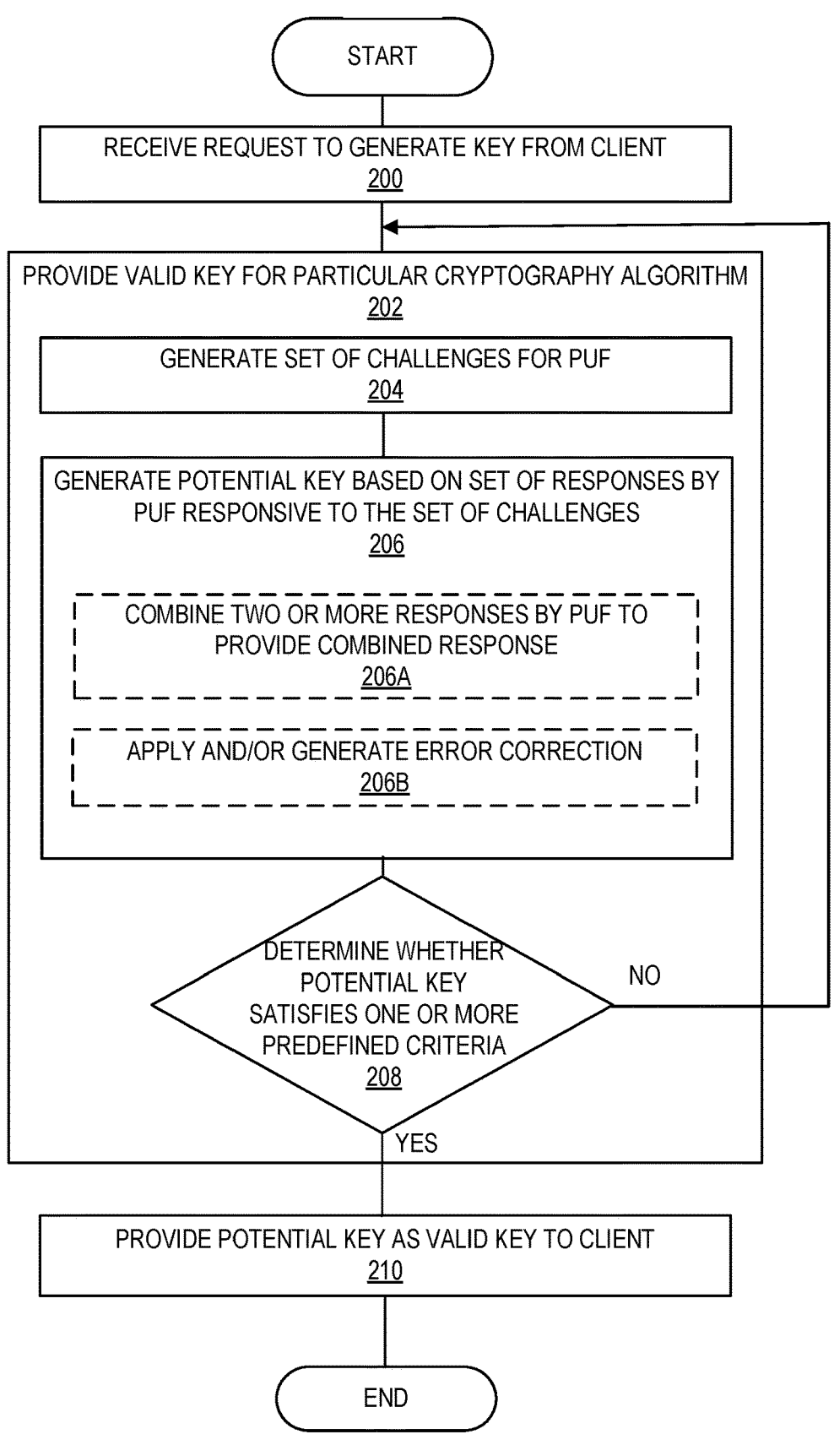
FIG. 2A is a flow chart that illustrates the operation of the device or computer of FIG. 1 for a generate mode of first, second, and third embodiments of the present disclosure.

FIG. 2A is a flow chart that illustrates the generate mode of operation of the secure hardware component 100 in accordance with a first embodiment (Embodiment 1) of the present disclosure. Again, optional steps are represented by dashed lines/boxes. The steps of the process of FIG. 2A are as follows:

Step 200: The secure hardware component 100 receives a request, from the client 120, to generate a key comprising a defined number, N, of bits for a particular cryptography algorithm.

Step 202: Responsive to the received request, the secure hardware component 100 provides the key for the particular cryptography algorithm. This step may comprise the following:

Step 204: The challenge generating function 108D generates a set of challenges for the PUF 106. The set of challenges may comprise (i) one challenge or (ii) more challenges from a plurality of challenges in a challenge space of the PUF 106.

Step 206: The PUF 106 generates at least one potential key based on a set of responses by the PUF 106 responsive to the set of challenges.

Step 206A: Optionally, when the set of challenges consists of two or more challenges, the controller 102 combines the two or more responses by the PUF 106 to provide a combined response.

Step 206B: Optionally, the PUF response is given to the error correction module 110, which generates and temporarily stores helper data corresponding to output of the PUF 106. Optionally, when the set of challenges consists of a single challenge, the error correction module 110 generates and/or applies an error correction, based on the helper data, to the single response by the PUF 106, responsive to the single challenge to provide the single potential key. Alternatively and optionally, when the set of challenges consists of two or more challenges, the error correction module 110 applies an error correction, based on the helper data, to the combined response to provide the single potential key.

Step 208: For each potential key of the at least one potential key, the validation module 114 determines whether the potential key satisfies one or more predefined criteria for the particular cryptography algorithm.

Step 210: If the potential key satisfies the one or more predefined criteria for the particular cryptography algorithm, the PUF 106 provides the potential key to the client 120 as the valid key.

If each of the at least one potential key does not satisfy the one or more predefined criteria for the particular cryptography algorithm (step 208, NO), the controller 102 and/or the validation module 114 repeat(s) the above steps 204-208 for different sets of challenges from the challenge space of the PUF 106 until the potential key satisfies the one or more predefined criteria for the particular cryptography algorithm. For example, if each of the at least one potential key does not satisfy the one or more predefined criteria for the particular cryptography algorithm, the validation module 114 may erase contents in the register and helper data and repeat steps 204-208.

Figure 2B:
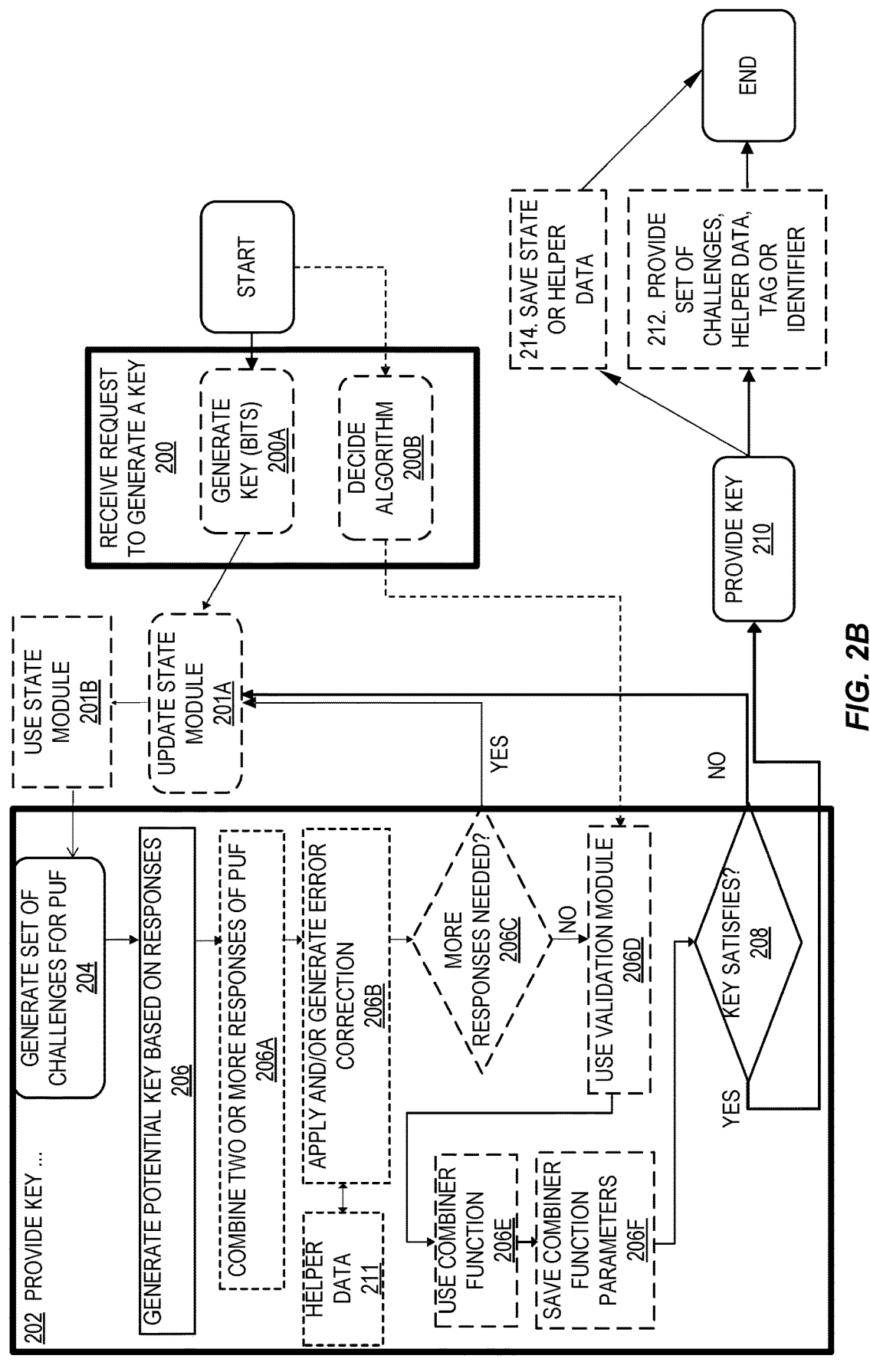
FIG. 2B is a flow chart that illustrates the process of FIG. 2A in more detail, in accordance with one embodiment of the present disclosure.

FIG. 2B is a flow chart that illustrates the process of FIG. 2A (generate mode) in more detail, in accordance with a first embodiment (Embodiment 1), a second embodiment (Embodiment 2), and a third embodiment (Embodiment 3) of the present disclosure. Again, optional steps are represented by dashed lines/boxes. The steps of the process of FIG. 2B are as follows.

The secure hardware component 100 receives a request, from the client 120, to generate a key comprising a defined number, M, of bits for a particular cryptography algorithm (step 200). The client 120 may provide the defined number of bits in the key to the secure hardware component 100 (step 200A). The client 120 may decide which particular cryptography algorithm it should be valid for and informs the particular cryptography algorithm to the validation module 114 of the secure hardware component 100 (step 200B).

Optionally, the client 120 provides a randomly chosen start state for the state module 108. Accordingly, the state module 108 is updated, and the new state is written to the state register 108A (step 201A). Optionally, the state module 108 is used with the new state stored in the state register 108A (step X201B).

Responsive to the received request, the secure hardware component 100 provides the key for the particular cryptography algorithm (step 202). This step may comprise the following sub-steps. The challenge generating function 108D generates a set of challenges for the PUF 106 (step 204). The set of challenges may comprise (i) one challenge or (ii) more challenges from a plurality of challenges in a challenge space of the PUF 106. In some cases, such as with the Static Random Access Memory (SRAM)-based PUF, the PUF 106 may be considered to only have "one challenge" if all bits are used (N=1). However, if blocks of memory cells of the SRAM may be selected individually, N sets of M memory cells are available. The PUF 106 can then be seen to have N challenges, each producing an M bit response. For example, the one challenge in the set of challenges may correspond to selection of at least one element in the PUF 106 to generate the set of responses and at least one in the set of responses is a result of the selection. For example, the one challenge in the set of challenges may correspond to configuration of at least one element in the PUF 106 and at least one in the set of responses is a result of the configuration.

The PUF 106 generates at least one potential key based on a set of responses by the PUF 106 responsive to the set of challenges (step 206). For example, when the set of challenges consists of a single challenge, the set of responses consists of a single response by the PUF 106 responsive to the single challenge, and the at least one potential key is a single potential key. The single potential key is based on at least a part of the single response. For example, when the set of challenges consists of two or more challenges, the set of responses by the PUF 106 responsive to the set of challenges consists of two or more responses. Optionally, when the set of challenges consists of two or more challenges, the validation module 114 combines the two or more responses by the PUF 106 to provide a combined response (step 206A). Optionally, the PUF response is given to the error correction module 110, which generates and temporarily stores helper data 211 corresponding to output of the PUF 106 (step X206B). Optionally, when the set of challenges consists of a single challenge, the error correction module 110 applies an error correction, based on the helper data 211, to the single response by the PUF 106, responsive to the single challenge to provide the single potential key. Optionally, when the set of challenges consists of two or more challenges, the error correction module 110 applies an error correction, based on the helper data 211, to the combined response to provide the single potential key. Optionally, the PUF response is appended to the verification register 114B.

If an additional response from the PUF 106 is needed to validate the potential key (step 206C), the controller 102 updates the state module 108 (step 201A) and repeats the steps 204 and 206. If any additional response from the PUF 106 is not needed, the controller 102 performs the next step.

The verification module 114 uses a predefined algorithm (for example, a particular algorithm determined and provided by the client 120) to determine if the verification register 114B matches the acceptance criterion (step 206D). Optionally, the two or more responses may be combined differently using a combiner function 118 (step 206E). The combiner function 118 may e.g. be a function concatenating the two or several the two or more responses. The parameters used by the combiner function 118 may be saved by the secure hardware component (step 206F). For each potential key of the at least one potential key, the validation module 114 determines whether the potential key satisfies one or more predefined criteria for the particular cryptography algorithm (step 208). If the potential key satisfies the one or more predefined criteria for the particular cryptography algorithm, the PUF 106 provides the potential key to the client 120 as the valid key (step 210).

If each of the at least one potential key does not satisfy the one or more predefined criteria for the particular cryptography algorithm, the controller 102, the PUF 106, and the validation module 114 repeat the above process from steps 201A to 208 for different sets of challenges from the challenge space of the PUF 106 until the potential key satisfies the one or more predefined criteria for the particular cryptography algorithm. For example, if each of the at least one potential key does not satisfy the one or more predefined criteria for the particular cryptography algorithm, the validation module 114 may erase contents in the register and helper data 211 and repeat steps 201A to 208.

Optionally, the secure hardware component 100 may further provide, to the client 120, the set of challenges, the helper data 211, a tag, or an Identifier (ID), which are used to create the valid key or are associated with the valid key (step 212). Optionally, the secure hardware component 100 may save the state and the helper data 211 (used to create the valid key) locally, e.g., in the memory 104 (step 214).

Figure 3A:
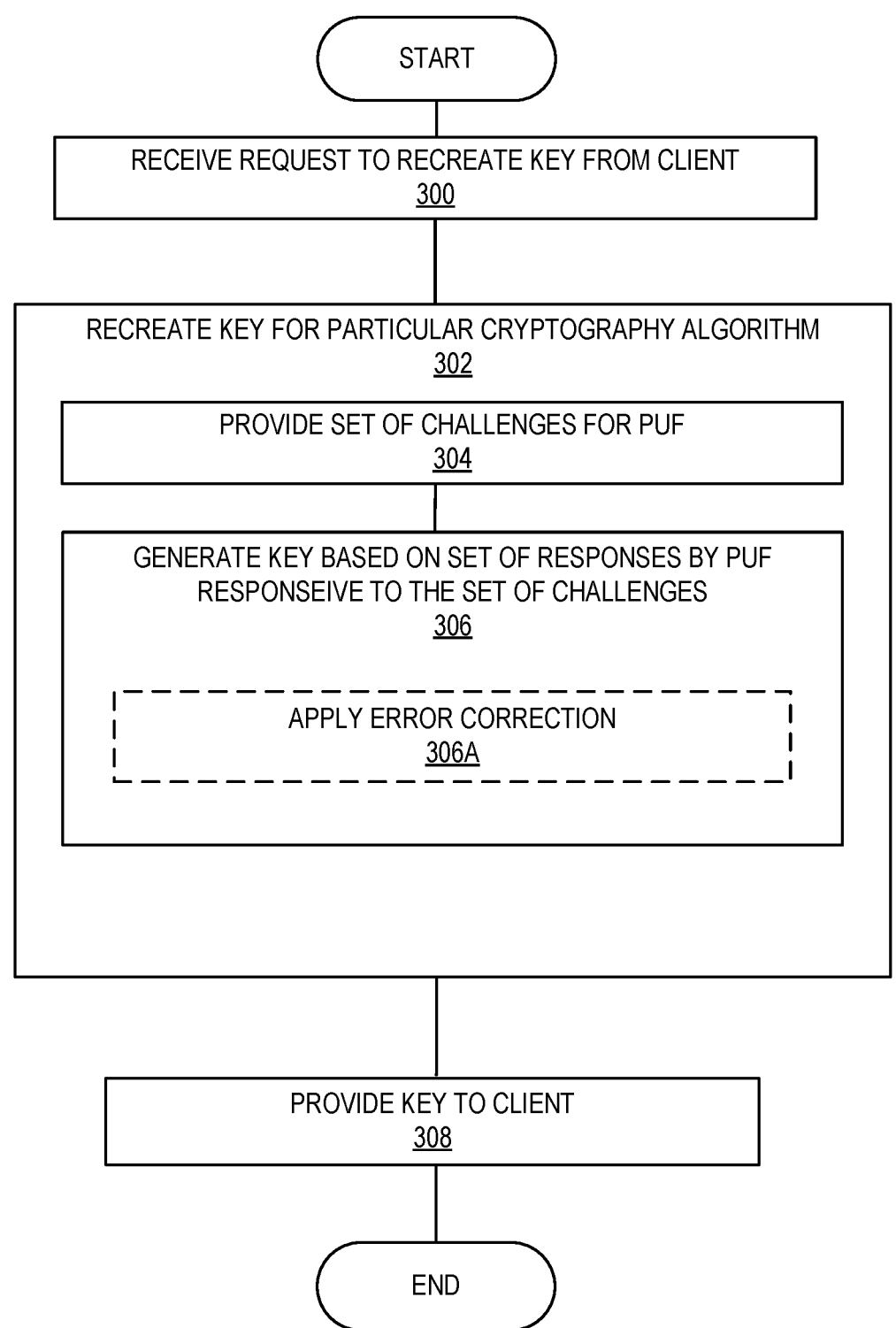
FIG. 3A is a flow chart that illustrates the operation of the device or computer of FIG. 1 for a recreate mode of the first embodiment of the present disclosure.

FIG. 3A is a flow chart that illustrates the operation of the device or computer of FIG. 1 for a recreate mode of the first embodiment (Embodiment 1) of the present disclosure. Optional steps are represented by dashed lines/boxes. The steps of the process of FIG. 3A are as follows:

Step 300: The secure hardware component 100 receives, from a client 120, a request to recreate a key comprising a defined number, M, of bits for the client 120 for a particular cryptography algorithm.

Step 302: Responsive to receiving the request, the PUF 106 recreates the key for the client 120 for the particular cryptography algorithm. This step comprises the following steps:

Step 304: The challenge generating function 108D provides a set of challenges to the PUF 106. The set of challenges comprises (i) one challenge or (ii) one or more of a plurality of challenges in a challenge space of the PUF 106. The set of challenges is a set of challenges that (a) is comprised in the request received from the client 120, (b) is stored in association with a tag or an identifier that is comprised in the request received from the client 120, or (c) is generated by the secure hardware component 100 based on a state that is either comprised in the request received from the client 120 or stored locally in the secure hardware component 100.

Step 306: The PUF 106 generates the key based on the set of responses responsive to the set of challenges. Optionally, the error correction module 110 applies an error correction code, based on helper data, to the set of responses (step 306A). Optionally, it is determined whether more responses are needed to generate the key (step 306B).

Step 308: the secure hardware component 100 provides the recreated key to the client 120.

Figure 3B:
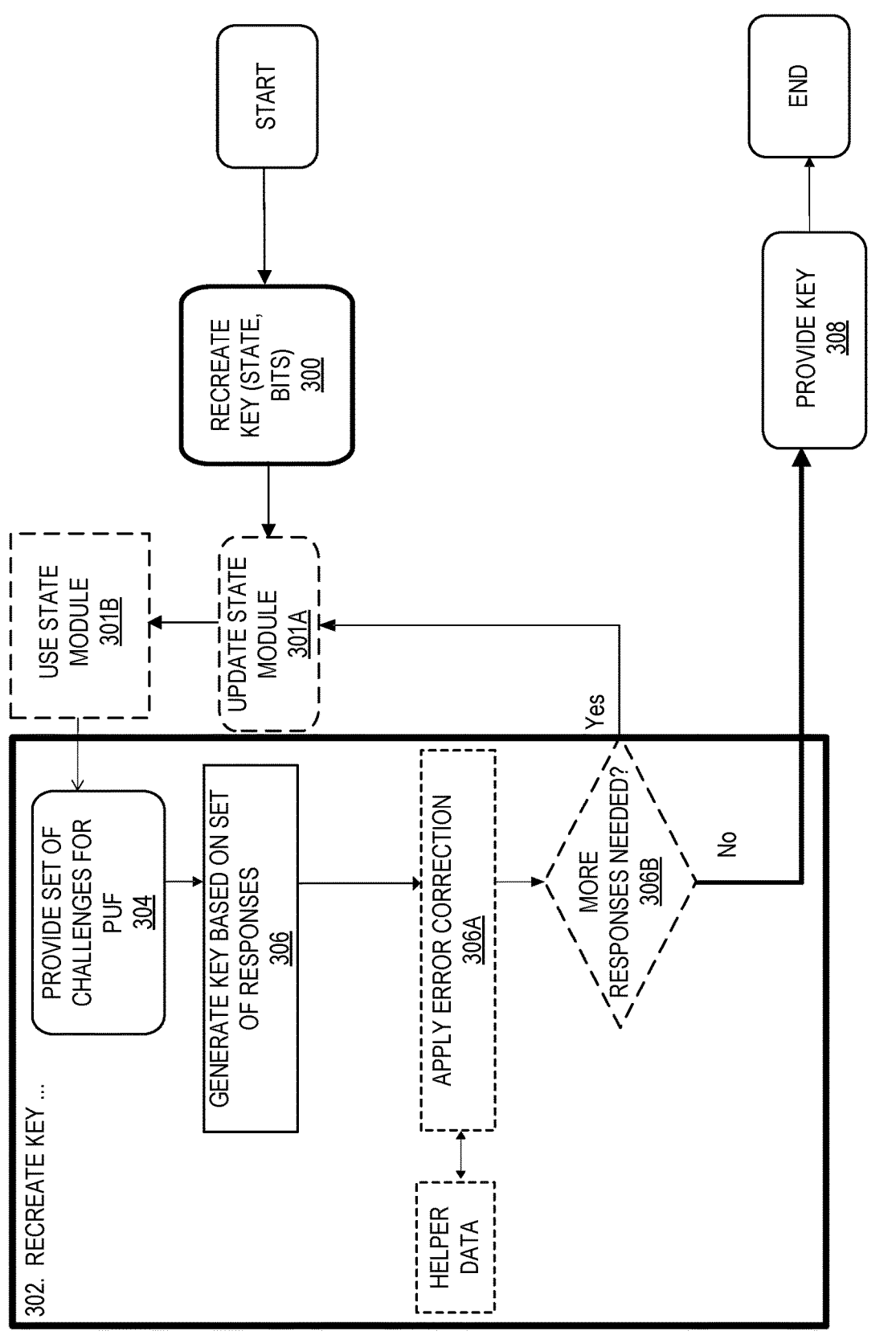
FIG. 3B is a flow chart that illustrates the process of FIG. 3A in more detail, in accordance with one embodiment of the present disclosure.

FIG. 3B is a flow chart that illustrates the process of FIG. 3A in more detail, in accordance with the recreate mode of the first embodiment (Embodiment 1). In the recreate mode of the first embodiment (Embodiment 1), the saved state is supplied by the client 120 (step 300). The saved state is loaded into the state module 108. The client 120 also supplies a key length determining how many PUF responses need to be generated and helper data which facilitates recreation of the same PUF response as were produced and validated in the generate mode. The supplied state is used to generate the first challenge for the PUF 106 (step 304). If additional PUF responses are needed, the state module 108 is updated (step 301A) and used (step 301B) by generating the same series of challenges as was created in the generate mode. Hence, for a key that comprises several PUF responses, the state module 108 may generate the same challenges for the PUF 106, given a predefined starting state.

The first embodiment (Embodiment 1) enables the PUF 106 to produce several different keys for the same user, which requires that a new seed be chosen for the state module 108 to avoid producing the same key twice. The client 120 saves the initial state and helper data for each key (step 214).

Embodiment 2

Figure 4:
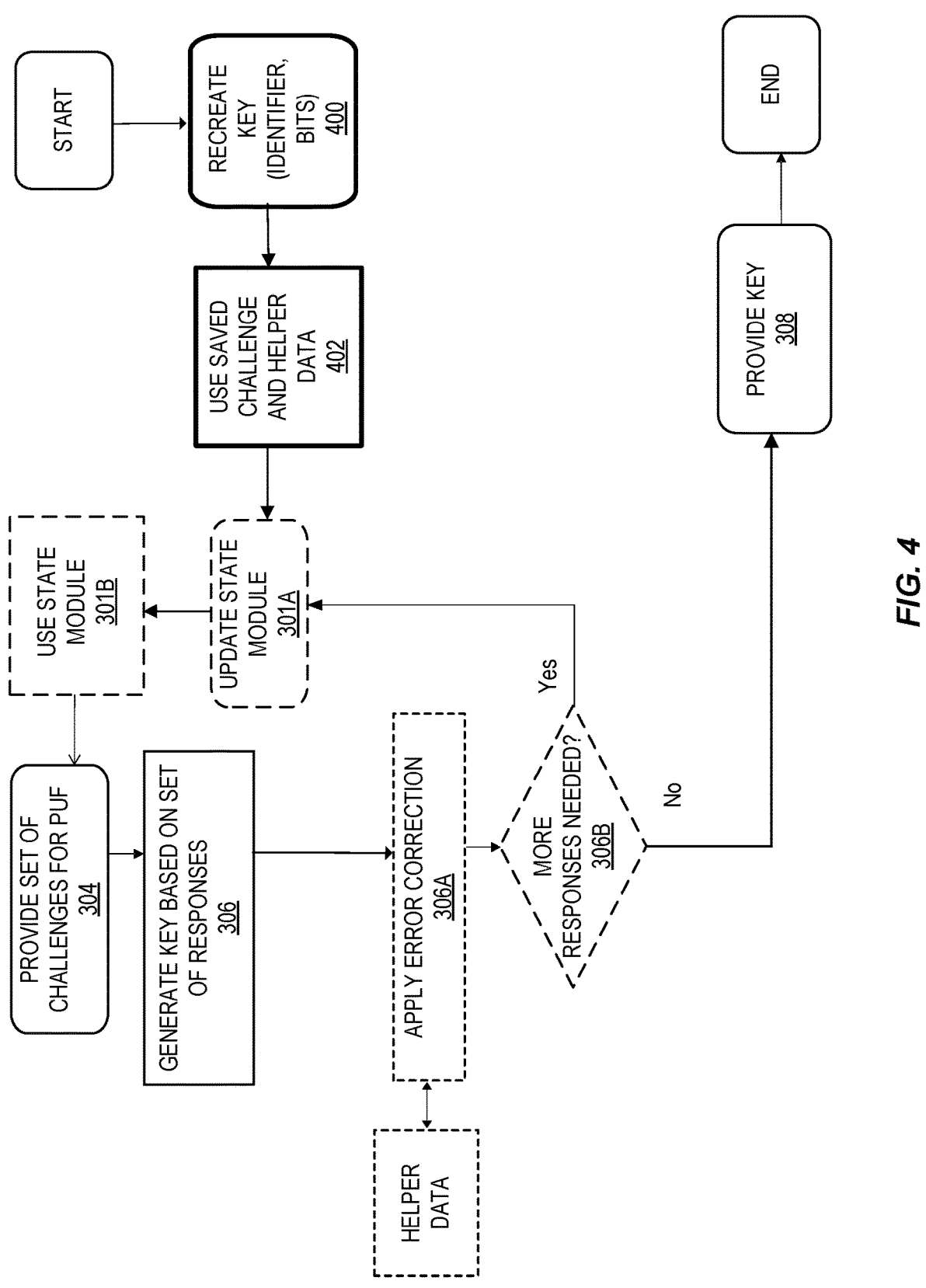
FIG. 4 is a flow chart that illustrates the operation of the device or computer of FIG. 1 for a recreate mode of the second embodiment of the present disclosure.

The generate mode of the second embodiment (Embodiment 2) is the same as the generate mode of the first embodiment (Embodiment 1), which is illustrated in FIGS. 2A and 2B and described above. FIG. 4 illustrates the recreate mode of the second embodiment (Embodiment 2). Most of the steps for the recreate mode of the second embodiment (Embodiment 2) illustrated in FIG. 4 are same as the steps for the recreate mode of the first embodiment (Embodiment 1) illustrated in FIG. 3A and FIG. 3B. Step 400 ("RECREATE KEY (IDENTIFIER, BITS)") and step 402 ("USE SAVED CHALLENGE AND HELPER DATA") in FIG. 4 are unique to the recreate mode of the second embodiment (Embodiment 2).

That is, in the second embodiment (Embodiment 2), the client 120 does not explicitly store the challenge nor the helper data. Instead, the challenge and the helper data are stored in a Non-Volatile Memory (NVM) (e.g., of either MTP or OTP type) on the secure hardware component 100. When the client 120 requests a key to be generated to the secure hardware component 100, and once a valid key has been found, the challenge and the helper data are stored by the secure hardware component 100. The challenge and the helper data may be tagged with an ID or a serial number. Afterward, when the client 120 wants to recreate the key, the client 120 provides the ID or the serial number related to the key to reproduce to the secure hardware component 100.

Embodiment 3

Figure 5:
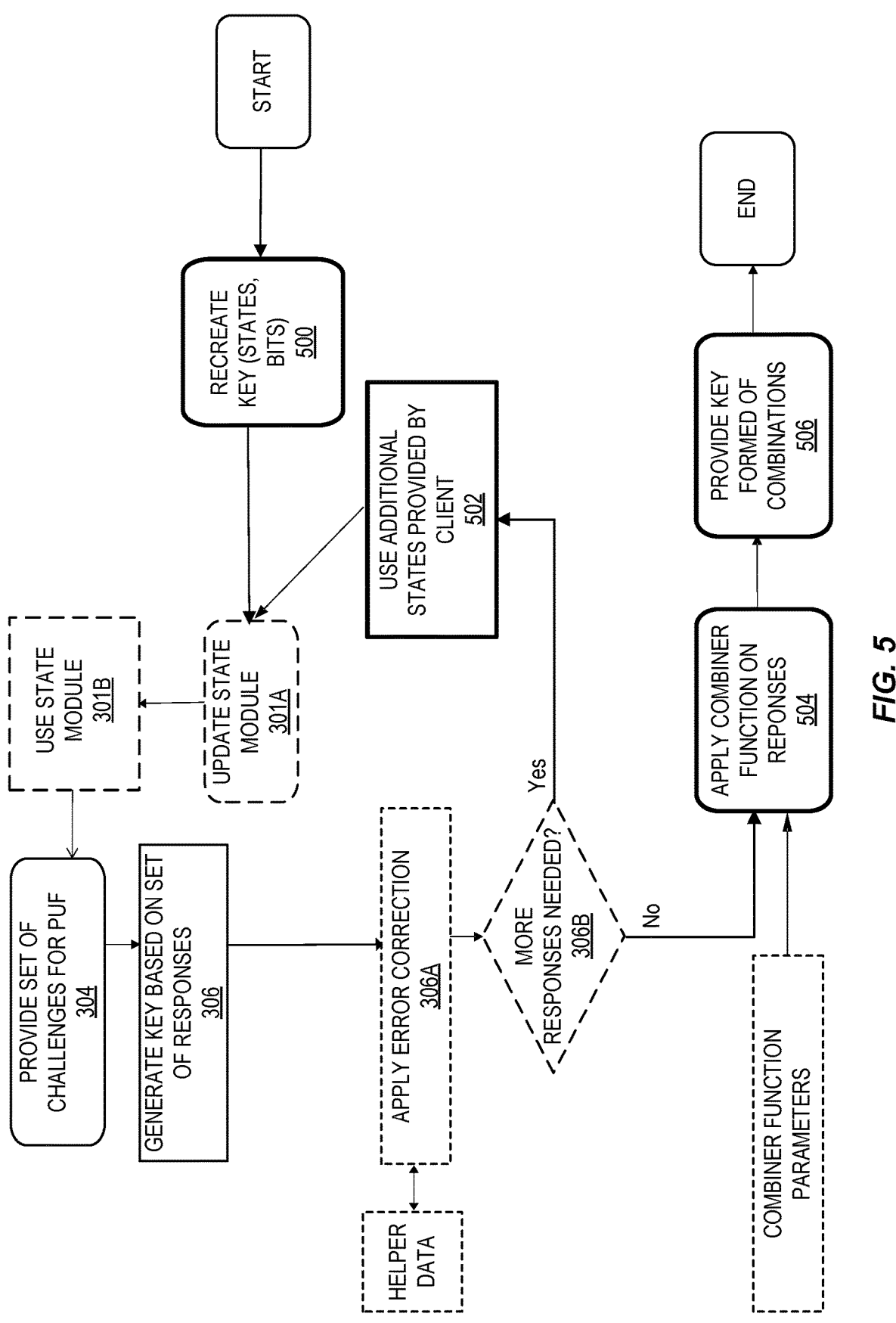
FIG. 5 is a flow chart that illustrates the operation of the device or computer of FIG. 1 for a recreate mode of the third embodiment of the present disclosure.

The generate mode of the third embodiment (Embodiment 3) is the same as the generate mode of Embodiment 1, which is illustrated in FIGS. 2A and 2B and described above. FIG. 5 illustrates the recreate mode of the third embodiment (Embodiment 3). Most of the steps for the recreate mode of the third embodiment (Embodiment 3) illustrated in FIG. 5 are the same as the steps for the recreate mode of the first embodiment (Embodiment 1) illustrated in FIG. 3A and FIG. 3B. Step 500 ("RECREATE KEY (STATES, BITS)"), step 502 ("USE ADDITIONAL STATES PROVIDED BY CLIENT"), step 504 ("APPLY COMBINER FUNCTION ON REPONSES"), and step 506 ("PROVIDE KEY OF COMBINATIONS") in FIG. 5 are unique to the recreate mode of the third embodiment (Embodiment 3) as explained below.

In the third embodiment (Embodiment 3), if the key comprises several PUF responses, each of these PUF responses may be seen as individual elements. Instead of just testing the PUF responses in the order they were generated, Embodiment 3 allows testing of all combinations to find a valid key. Let $f(x_1, \ldots, x_N)$ denote the combiner function 118 taking N values as input used to combine N different input values to an M bit output. There are N! possible ways to order the arguments to such a combiner function.

Let the PUF responses A, B, C, D, E be created in that order. Given the PUF responses f(A, B, C), 3! (=6) possible input combinations can be tried to form a valid key. The validation module 114 may, for example, send possible input combinations, such as f(A,C,B), f(B,A,C) etc., to the combiner function 118 (step 206E). Afterwards, the validation module 114 may test if the output of the combiner function 118 is a valid key (step 208). Thus, the key provided to the client 120 is formed by two or more responses combined using different combinations (step 210). One exemplary realization of the combiner function 118 is concatenation, i.e. f(A,B,C)=A‖B‖C, which is realized as A concatenated with B which in turn is in concatenated with C. The validation module 114 may also use partial responses and also linear and non-linear mathematical operations such as XOR, modular arithmetic, etc. to find a valid key. The validation module 114 may save the parameters used by the combiner function 118 during each attempt to create a valid key (step 206F). The combiner function 118 may also skip certain PUF responses in order to generate a valid key. The validation module 114 tests several possible combinations such as f(A,B,D), f(A,C,E), etc. It is also possible to implement the combiner function 118 by altering the order in which the states and thereby the challenges are supplied to the PUF 106. For example, by first applying the challenges 1, 2, 3 and subsequently 2, 3, 1, etc. The combiner function 118 can be implemented as a part of the validation module 114 when PUF responses are combined, or as a part of the state module 108 when different combinations of challenge inputs are used.

The difference between the recreate mode of the third embodiment (Embodiment 3) and the recreate mode of the first embodiment (Embodiment 1) is that the state module 108 is not used during the recreate mode of the third embodiment (Embodiment 3). Instead, the client 120 stores all states used to recreate the key, off chip, and provides the states in the correct order when the key is to be recreated (step 502). Alternatively, the state module is used, and in lieu, the combination of responses which forms a valid key is applied (step 504) before providing the key to the client (step 506).

The states used to create the key can either be stored explicitly or as how many times the state module 108 should be updated before the next PUF generation. The third embodiment (Embodiment 3) can be implemented as either a variant of Embodiment 1 or a variation of the second embodiment (Embodiment 2) (i.e., with states stored by the client 120 or on the secure hardware component 100).

Embodiment 4

Figure 6:
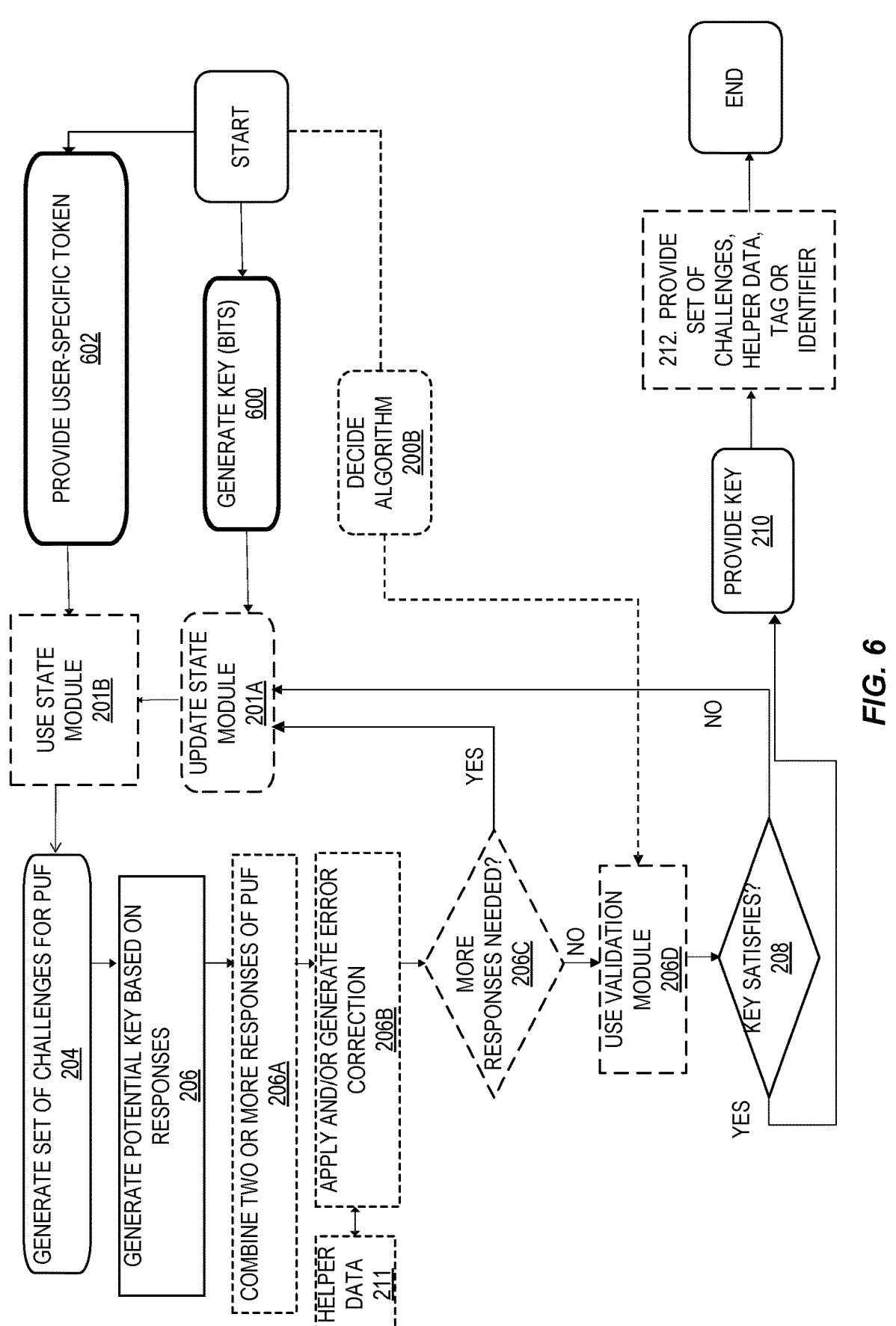
FIG. 6 is a flow chart that illustrates the operation of the device or computer of FIG. 1 for a generate mode of a fourth embodiment of the present disclosure.

FIG. 6 illustrates the generate mode of the fourth embodiment (Embodiment 4). Most of the steps for the generate mode of the fourth embodiment (Embodiment 4) illustrated in FIG. 6 are the same as the steps for the generate mode of the first embodiment (Embodiment 1) illustrated in FIG. 2B. Step 602 ("PROVIDE USER-SPECIFIC TOKEN") of FIG. 6 is unique to the generate mode of the fourth embodiment (Embodiment 4).

In other words, during the generation of the challenges by the PUF 106, the user additionally provides a user-specific token, such as a password, a Personal Identification Number (PIN) or biometric input (step 602). The user-specific token may be used in combination as an input to the state module 108 to make the token be user-specific. If biometric input is used, it may require separate helper data 211 and error correction to ensure the generation of the same token during each recreation of the key.

Figure 7:
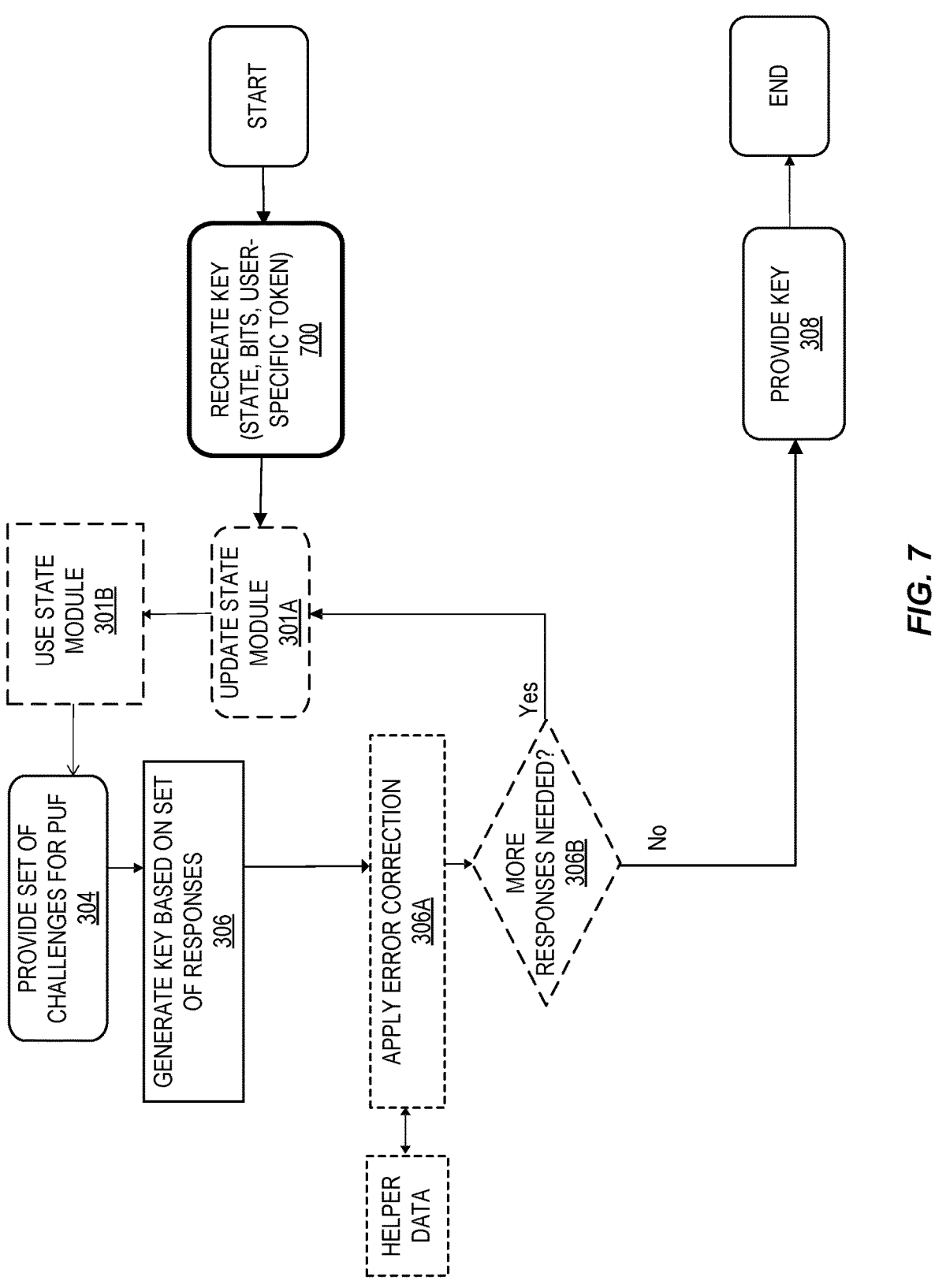
FIG. 7 is a flow chart that illustrates the operation of the device or computer of FIG. 1 for a recreate mode of the fourth embodiment of the present disclosure.

FIG. 7 illustrates the recreate mode of the fourth embodiment (Embodiment 4). Most of the steps for the recreate mode of the fourth embodiment (Embodiment 4) illustrated in FIG. 7 are same as the steps for the recreate mode of the first embodiment (Embodiment 1) illustrated in FIG. 3A and FIG. 3B. In FIG. 7, step 700 for the recreate mode of the fourth embodiment (Embodiment 4) indicates receiving a request from the client 120 to recreate a valid key based on the user-specific token provided by the client 120. This step is unique to the recreate mode of the fourth embodiment (Embodiment 4).

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

AES Advanced Encryption Standard
ASIC Application Specific Integrated Circuit
BBRAM Battery Backed Random Access Memory
BCH Bose-Chaudhuri-Hocquenghem
CASR Cellular Automata Shift Register
CRP Challenge-Response Pair
CPU Central Processing Unit
DES Data Encryption Standard
DSA Digital Signature Algorithm
ECDSA Elliptic Curve Digital Signature Algorithm
FPGA Field Programmable Gate Array
GCM Galois/Counter Mode
GLP Güneysu, Lyubashevsky, and Pöppelmann
GMAC Galois Message Authentication Code
HMAC Hash-based Message Authentication Code
IC Integrated Circuit
ID Identifier
IDEA International Data Encryption Algorithm
KDF Key Derivation Function
KEK Key Encryption Key
LFSR Linear Feedback Shift Register
LUT Lookup Table
MTP Multi Time Programmable NLFSR Non-Linear Feedback Shift Register
NTRU N-th Degree Truncated Polynomial Ring
NVM Non-Volatile Memory
OTP One Time Programmable
OWF One-Way Function
PIN Personal Identification Number
PRNG Pseudo-Random Number Generator
PUF Physically Unclonable Function
RAM Random Access Memory
RC4 Rivest Cipher 4
ROM Read Only Memory
RSA Rivest-Shamir-Adleman
SoC System on a Chip
SRAM Static Random Access Memory Those skilled in the art will recognize improvements and modifications to the embodiments of the present disclosure. All such improvements and modifications are considered within the scope of the concepts disclosed herein.

The invention claimed is:

1. A method for providing a cryptographic key to a client, the method comprising:
 receiving from the client a request to generate a key comprising a defined number, N, of bits for a particular cryptography algorithm; and
 responsive to receiving the request, providing a valid key for the particular cryptography algorithm to the client, wherein providing the valid key for the particular cryptography algorithm comprises:
 generating a set of challenges for a Physically Unclonable Function, PUF, wherein the set of challenges comprises one or more challenges from a plurality of challenges in a challenge space of the PUF;
 generating at least one potential key based on a set of two or more responses by the PUF responsive to the set of challenges, wherein generating the at least one potential key comprises combining at least two responses included in the set of responses;
 for each potential key of the at least one potential key:
 determining whether the potential key satisfies one or more predefined criteria for the particular cryptography algorithm; and
 in response to determining that the potential key satisfies the one or more predefined criteria for the particular cryptography algorithm, providing the potential key to the client as the valid key.

2. The method of claim 1 wherein a first challenge in the set of challenges corresponds to selection of at least one element in the PUF and at least one response in the set of responses is a result of the selection.

3. The method of claim 1 wherein a first challenge in the set of challenges corresponds to configuration of at least one element in the PUF and at least one response in the set of responses is a result of the configuration.

4. The method of claim 1 wherein generating the at least one potential key comprises applying error correction based on helper data to the set of responses.

5. The method of claim 1 wherein:
 the set of challenges consists of a single challenge,
 the set of responses consists of a single response by the PUF responsive to the single challenge,
 the at least one potential key is a single potential key, and
 the single potential key is based on at least a part of the single response.

6. The method of claim 5 wherein generating the at least one potential key comprises generating helper data responsive to the single response by the PUF.

7. The method of claim 1 wherein the set of challenges consists of two or more challenges.

8. The method of claim 1, wherein combining the at least two responses comprises combining at least a first part of a first response and a second part of a second response.

9. The method of claim 8 wherein the at least one potential key consists of two or more potential keys, and wherein each of the two or more potential keys are formed by at least one function taking at least one part of each of the two or more responses as input.

10. The method of claim 1, wherein generating the at least one potential key comprises applying error correction using helper data to at least one of the two or more responses.

11. The method of claim 1, further comprising providing the set of challenges used to generate the valid key to the client.

12. The method of claim 11 wherein:

generating the potential key comprises generating the potential key based on the set of responses by the PUF responsive to the set of challenges and associated helper data; and the method further comprising at least one of providing the associated helper data used to generate the valid key to the client or saving the associated helper data locally in the client.

13. The method of claim 1, wherein:

generating the set of challenges for the PUF comprises generating the set of challenges for the PUF based on a state of a state module; and the method further comprising at least one of providing to the client the state used to generate the set of challenges used to generate the valid key or saving the state locally in the client.

14. The method of claim 1 further comprising storing information that indicates the set of challenges used to generate the valid key in association with a tag or an identifier, and providing the tag or the identifier to the client.

15. The method of claim 1, wherein receiving the request to generate a key further comprises receiving a unique token, and generating the set of challenges for the PUF comprises generating the set of challenges for the PUF based on the unique token.

16. The method of claim 15 wherein the unique token is one or more of a password, a Personal Identification Number, PIN, and biometric input.

17. A device for generating a key for a cryptography algorithm, comprising:

one or more processing circuitries;

a memory storing instructions which, when executed by the one or more processing circuitries, cause the device to:

receive from a client a request to generate a key comprising a defined number, N, of bits for a particular cryptography algorithm;

responsive to receiving the request, provide a valid key for the particular cryptography algorithm to the client, wherein providing the valid key to the client comprises:

generating a set of challenges for a Physically Unclonable Function, PUF, wherein the set of challenges comprises one or more challenges from a plurality of challenges in a challenge space of the PUF;

generating at least one potential key based on a set of two or more responses by the PUF responsive to the set of challenges, wherein generating the at least one potential key comprises combining at least two responses included in the set of responses;

for each potential key of the at least one potential key:

determining whether the potential key satisfies one or more predefined criteria for the particular cryptography algorithm; and in response to determining that the potential key satisfies the one or more predefined criteria for the particular cryptography algorithm, providing the potential key to the client as the valid key.

\* \* \* \* \*